United States Patent

Bejot et al.

[11] Patent Number: 5,249,648
[45] Date of Patent: Oct. 5, 1993

[54] WEDGE TYPE DISC BRAKE

[75] Inventors: Philippe Bejot, Paris; Edgard Fabbro, Le Vesinet, both of France

[73] Assignee: Bendix Europe Services Techniques, Drancy, France

[21] Appl. No.: 967,918

[22] Filed: Oct. 28, 1992

Related U.S. Application Data

[63] Continuation of Ser. No. 821,878, Jan. 17, 1992, abandoned, which is a continuation of Ser. No. 640,191, Jan. 11, 1991, abandoned.

[30] Foreign Application Priority Data

Jan. 31, 1990 [FR] France .................. 90 01119

[51] Int. Cl.⁵ .......................... F16D 55/2265
[52] U.S. Cl. .................. 188/72.7; 188/73.44; 188/73.45; 192/70.23
[58] Field of Search .......... 188/72.7, 72.1, 72.6, 188/73.44, 73.45, 106 F; 192/70.23, 93 C

[56] References Cited

U.S. PATENT DOCUMENTS

| | | |
|---|---|---|
| 2,911,070 | 11/1959 | Seelig, Jr. .................. 188/59 |
| 3,980,159 | 9/1976 | Baxendale ................. 188/72.7 |
| 4,154,321 | 5/1979 | Falk ........................... 188/72.7 |
| 4,585,095 | 4/1986 | Idel ............................ 188/71.9 |
| 4,630,713 | 12/1986 | Carre et al. ............... 188/73.44 |
| 4,856,620 | 8/1989 | Thiel et al. ............ 188/73.45 X |

FOREIGN PATENT DOCUMENTS

| | | |
|---|---|---|
| 3717072 | 12/1988 | Fed. Rep. of Germany. |
| 88051 | 10/1966 | France ...................... 188/72.1 |
| 1589010 | 4/1970 | France. |
| 251533 | 11/1987 | Japan ........................ 188/72.7 |

Primary Examiner—George A. Halvosa
Attorney, Agent, or Firm—Larry J. Palguta; Ken C. Decker

[57] ABSTRACT

The disk-brake comprises a clevis (5), a sliding caliper (3) and an operating mechanism, the latter comprising a mechanism (19) having a wedge displaceable longitudinally between the caliper (3) and a piston, to move them apart, through the action of a pusher (21), which in turn is driven by the pushrod (25) of a drive mechanism (23). The drive mechanism (23) is fastened to the clevis (5) of the brake and the pusher (21) exerts on the wedge a force whose main component is parallel to the plane of the disk and directed in the predominant direction of rotation of the latter.

1 Claim, 1 Drawing Sheet

5,249,648

WEDGE TYPE DISC BRAKE

This is a continuation of abandoned application Ser. No. 07/821,878 filed Jan. 17, 1992 which is a continuation of abandoned application Ser. No. 07/640,191 filed on Jan. 11, 1991 now abandoned.

BACKGROUND OF THE INVENTION

The present invention relates to sliding-caliper disk-brakes provided with a wedge type operating mechanism. Brakes of this kind are generally used in motor vehicles of the truck type and are well known to those skilled in the art.

U.S. Pat. No. 4,621,713 describes one example of a brake- of this kind. A piston is coupled to a brake pad and the caliper to another pad. Convergent inclined surfaces of a wedge cooperating with rollers between the surfaces of the piston and caliper enable these surfaces to be moved apart relative to one another by longitudinal displacement of the wedge, thus bringing the brake pads and the disk into contact. The force applied to the wedge is therefore converted into two opposite forces at right angles to the plane of the disk. This force applied to the wedge is generated by a diaphragm vessel fixed to the caliper and generally operated by compressed air. The reaction force is therefore applied directly to the means fastening the vessel to the caliper.

The caliper slides, likewise in known manner, relative to the clevis on at least one column fixed to the clevis. This column receives a substantial part of the brake force. During braking, in fact, the friction between the pad driven by the caliper and the disk produces a force parallel to the disk and directed in the direction of rotation of the disk. This force is at right angles to the axis of the column and tends to turn the caliper about the zone of contact between the caliper and the column. This results in the flection of the latter, which must then be oversized, and in a less easy sliding of the caliper on the column in proportion to the brake force increase.

SUMMARY OF THE INVENTION

The invention seeks to obviate this disadvantage by not allowing the column to work in flection.

The invention therefore relates to a disk-brake comprising a clevis, a caliper sliding on at least one column and an operating mechanism, the latter comprising a mechanism having a wedge displaceable longitudinally between the caliper and a piston to move them apart through the action of a pusher, which in turn is driven by the pushrod of a drive means.

According to the invention the drive means is fastened to the clevis of the brake and the pusher exerts on the wedge a force whose main component is parallel to the plane of the disk and directed in the predominant direction of rotation of the latter, this force bearing against the clevis and opposing the flexion of the column.

The pusher is preferably driven by the pushrod with the aid of a member forming a lever whose pivot is fastened to the clevis, and the pusher is fixed on the one hand to the member forming a pivot and on the other hand to the wedge by means of ball joints.

BRIEF DESCRIPTION OF THE INVENTION

The invention will be better understood and other advantages, aims and features thereof will be seen more clearly on perusal of the following description of one preferred embodiment, which is given without constituting a limitation and which is accompanied by one sheet of drawings, in which:

FIG. 1 shows diagrammatically in perspective a brake according to the present invention, and FIG. 2 is a partial view from above of the brake shown in FIG. 1, illustrating the distribution of the brake forces.

DETAILED DESCRIPTION OF THE INVENTION

Figure 1:
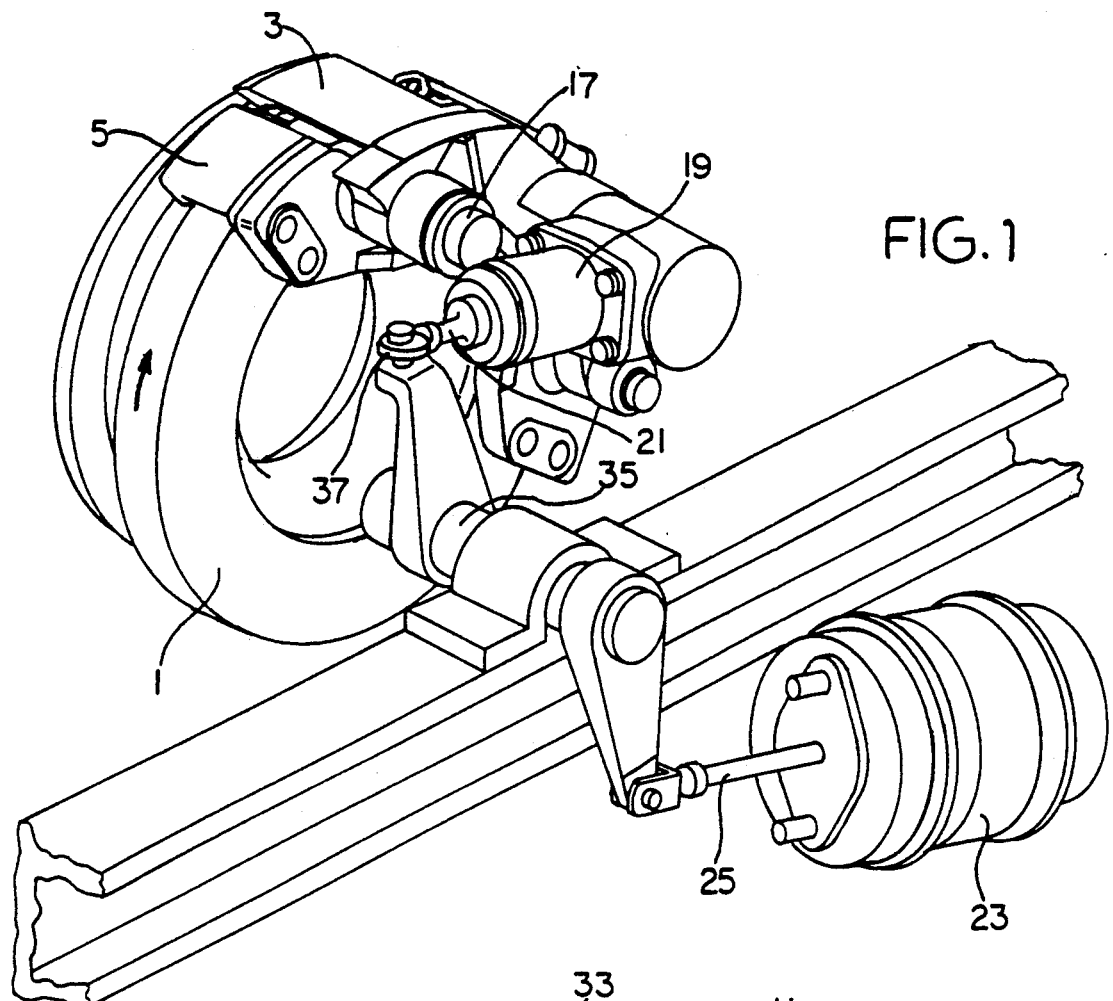
Figure 2:
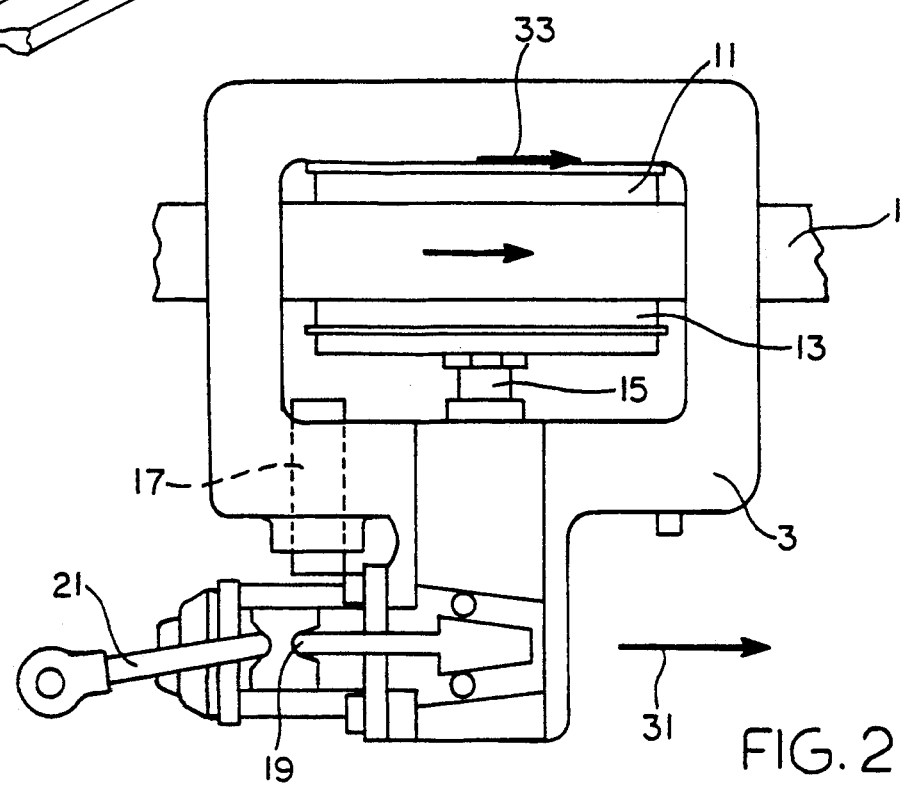

Referring now to the Figures, the disk 1 is fastened in rotation with the wheel which is to be braked. The brake comprises a caliper 3 and a clevis 5. The brake pads 11, 13 are respectively applied against the disk 1 by the caliper 3 and by a piston 15, which is optionally provided with an automatic wear take-up mechanism. The caliper 3 is fixed to the clevis with the end of a column 17. In a manner known per se the rear portions of the caliper 3 and piston 15 are moved apart by means of a wedge mechanism 19 which is well known to those skilled in the art and which is located in the caliper 3. This mechanism 19 therefore comprises a wedge and a pusher 21 enabling the wedge to be moved between the surfaces facing one another.

A diaphragm vessel or drive means 23 or the equivalent is fixed to a member fastened to the brake clevis 5. The pushrod 25 of said vessel 23 acts on the pusher 21 of the wedge mechanism 19.

According to one essential aspect of the invention, the pusher 21 exerts on the wedge a force whose main component is parallel to the plane of the disk and directed in the predominant direction of rotation of the latter (corresponding of course to forward travel of the vehicle thus equipped), which is represented by an arrow in the Figures. Because the drive means 23 is fixed directly or indirectly to the clevis 5, and therefore bears against the latter to generate the force which will act on the pusher 21, the reaction force is taken by the caliper 3, which receives a force 31 parallel to the force 33 generated by the friction of the pad 11 on the disk 1, which force previously produced the flection of the column 17. This force 31, being applied to the rear of the piston in the brake, will enable the column 17 to work normally in shear instead of in flection.

Judicious choice of the angle between the pusher 21 and the axis of the piston 15 enables the two parallel forces 31 and 33 to be substantially equivalent under certain difficult working conditions.

In the example illustrated the pusher 21 and the push-rod 25 are connected together with the aid of a lever whose pivot 35 is also fastened relative to the clevis 5. This essentially provides two additional advantages, namely on the one hand the modification of the ratio between the force generated by the vessel 23 and the force applied to the pusher 21, and on the other hand the fact that the vessel 23 can be disposed elsewhere than in the restricted space near the wheel and the shock absorbers of the latter (which are not shown in the FIGS.).

In addition, because of the movement of the caliper 3, and therefore of the wedge mechanism, it is highly desirable that the ends of the pusher 21 should be provided with a ball joint 37 in order to prevent the generation of parasitic forces on the pusher 21.

Although only one embodiment of the invention has been described, it is obvious that those skilled in the art can make numerous modifications to the invention without going beyond the scope defined by the accompanying claims.

For example, the brake may have two columns instead of only one. The lever may have a different shape from that illustrated, or even be entirely omitted, the ball joint being in that case disposed between the pusher 21 and the pushrod 25.

What we claim is:

1. A disc-brake comprising:
   a clevis;
   only one column secured on the clevis;
   a caliper sliding on said column along a first direction, said caliper receiving, during a braking operation, a driving force generated by friction of a brake pad on a disc and applied along a second direction substantially perpendicular to said first direction, said driving force causing a flexion of said column;
   a wedge slidingly supported by the caliper and moveable along said second direction, a movement of said wedge along said second direction resulting in a braking operation; and
   force generating means for moving said wedge by the application of a braking force on said wedge, wherein said braking force is generated between said clevis and said wedge, is substantially parallel to said driving force, and opposes the flexion caused by said driving force on said column.

* * * * *